July 1, 1930. C. C. GOODRICH 1,769,258
LUBRICATING SYSTEM
Filed July 24, 1926
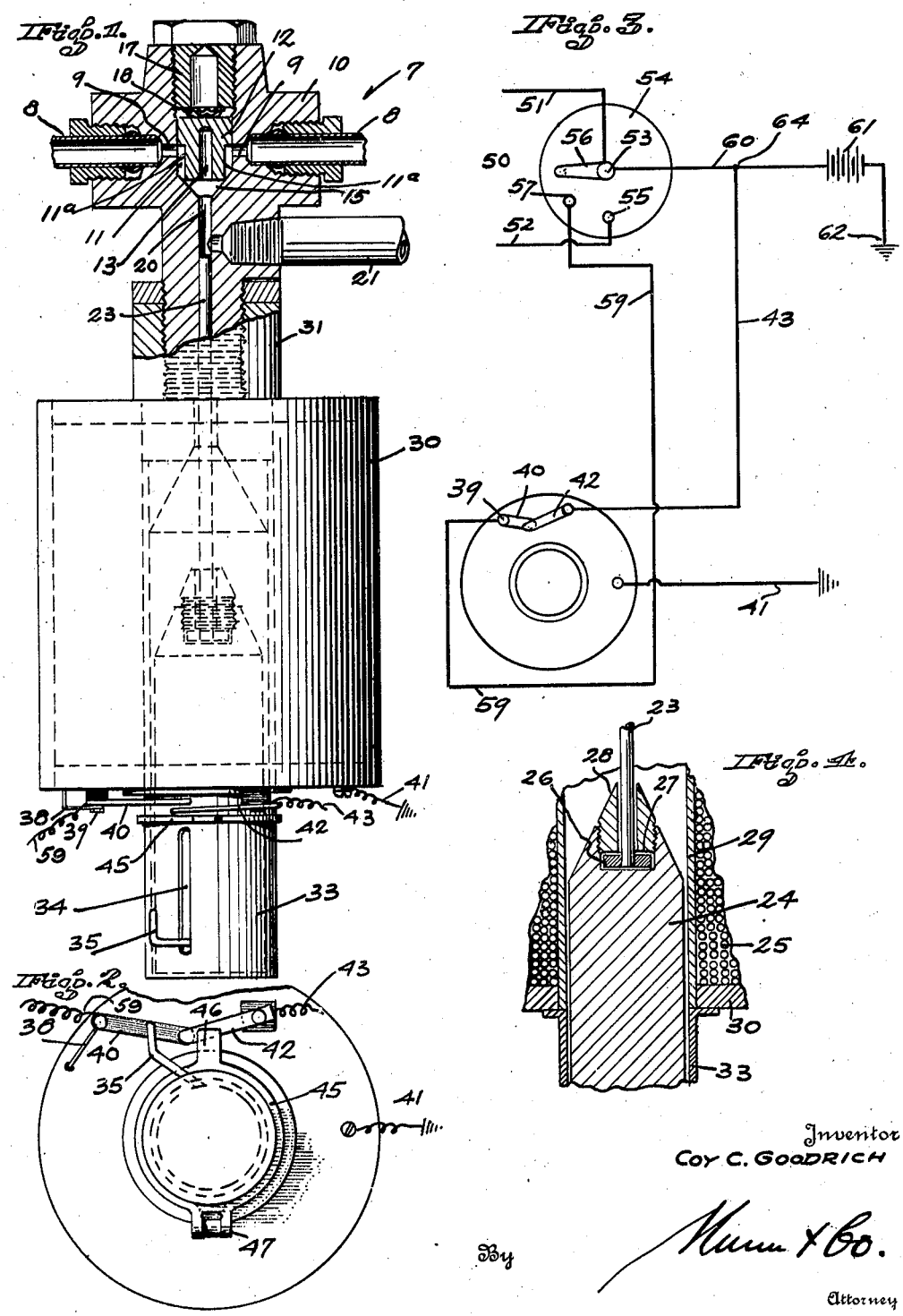
Inventor
Coy C. GOODRICH Patented July 1, 1930

1,769,258

UNITED STATES PATENT OFFICE

COY C. GOODRICH, OF SAN FRANCISCO, CALIFORNIA

LUBRICATING SYSTEM

Application filed July 24, 1926. Serial No. 124,750.

This invention relates to lubricating systems and is particularly adapted as a lubricating system for use on automobiles.

An object of my invention is the provision of a lubricating system which may be actuated by electrical apparatus.

Another object of my invention is the provision of a lubricating system operated by electrical apparatus which includes the ignition switch of an automobile.

With the foregoing objects in view, together with such other object and advantages as may subsequently appear, this invention resides in the construction and arrangement of parts hereinafter described and claimed, and illustrated in the accompanying drawings, in which:

Figure 1 is an elevational view of a solenoid and associated parts in combination with a plunger combined with a lubricating system fragmentarily shown in section.

Figure 2 is a fragmentary bottom plan view of Figure 1.

Figure 3 is a diagram of electrical circuits employed in combination with the solenoid shown in Figure 1, and in combination with an ignition switch which is combined with an ignition circuit, and Figure 4 is a fragmentary sectional view of a solenoid, core and plunger employed in the apparatus in Figure 1.

Referring to the drawings for more detailed description thereof, the upper portion of Figure 1 designated by the numeral 7 indicates part of a lubricating system which may be disposed on an automobile.

The lubricating system may comprise tubes 8 leading to different parts of an automobile to be lubricated. The tubes 8 have communication through apertures 9 formed in a body 10, with a recess 11 formed in the body 10. Within the recess 11 is disposed a plug member or valve 12, with vertical grooves 11ª in its lower portion communicating with the passages 9 and provided with a central vertical recess 13. The grooves 11ª correspond in number to the tubes 8 and each groove communicates with a tube. The plug member 12 is pressed down on the tapered periphery 15 which bounds the recess 11 by means of a plug 17 screwed into the block 10 and pressing on a spring 18 which is in contact with the top of the block member 12.

Communicating with the recess 11 is a vertical aperture 20 extending downwardly through the block 10, the upper part of the aperture 20 and the recess 11 comprising a reservoir into which oil may flow from a pipe or tube 21 leading to a supply tank. The part of the lubricating system which has just been described is similar to that shown in my Patent No. 1,623,240 issued April 5, 1927.

The plug member 12 functions as a valve, since it may be raised from its seat against the spring 18 by any suitable pressure, such, for example, as the pressure of the lubricant when pressure is applied to the lubricant.

When the valve 12 is raised from its seat, the lubricant may flow through the grooves 11ª, passages 9 and tubes 8 to the parts intended, the amount of oil through any tube 8 being controlled by the size of its corresponding groove 11ª. When pressure on the fluid is released, the valve 12 will be again seated and shut off the passageway between the aperture 20 and the tubes 8. The lubricant in the reservoir, comprising the apertures 20 and 13 and the recess 11, may have pressure exerted on it by a plunger 23 which is secured, as best shown in Figure 4, to the top of the magnetizable core 24 of a solenoid 25. The plunger 23 has a collar 26 within a recess 27 formed in the top of the core. The top of the recess 27 is threaded and threadedly engages a plug 28 which is screwed into the core and which is apertured so that it may be slipped over the plunger 23.

The core 24 is provided with a casing 29, while the solenoid 25 is provided with a casing 30. The casing 30 of the solenoid is reduced in diameter at its upper portion 31 and this reduced portion threadedly engages the lower end of the block 10. Secured to the bottom of the solenoid casing 30 is a hollow cylinder 33 closed at its bottom and adapted to receive the lower part of the core 24. The hollow cylinder 33 is provided with a vertical slot 34 through which extends an L-shaped member 35 secured to the bottom of the core. One terminal of the solenoid is designated by the numeral 38 and this terminal is secured to a binding post 39 to which is secured a spring contactor 40, the other terminal 41 of the solenoid is grounded.

To the base of the cylinder casing 30 is secured a spring contactor 42, while a lead wire 43 is secured to the contactor 42. The contactor 42 is normally separated from the contactor 40, but is adapted when pressed upwardly, to come into contact with the contactor 40. An annular ring 45, having a projection 46 is pivoted as shown at 47 in Figure 2 to the hollow cylinder 33 attached to the base of the solenoid casing 30.

The pivot ring 45, which is of light weight, is pulled upwardly upon a slight magnetization of the core 24, and when so pulled the projection 46 contacts with the contactor 40. The angular member 35, which is secured to the core 24, is adapted, when the core is pulled upwardly to a sufficient degree, to come into contact with the contactor 40, pressing it upwardly and separating the the contactor 40 from the contactor 42.

Referring now to Figure 3, an ignition circuit 50 comprises a conductor 51 and a conductor 52, the former being connected to a pin 53 at the center of an ignition switch 54, while the conductor 52 is secured to a terminal 55 on the switch 54. The ignition switch 54 comprises an arm 56 connected with the pin 53 and adapted to contact with a terminal 57 and also with the terminal 55.

In Figure 3, the arm 56 of the switch is shown in "off" position. When the arm 56 comes into contact with the terminal 55, it is in the "on" position. It will be noticed that the terminal 57 is in the path of the arm 56, as the latter is turned from "off" position to "on" position. Connected to the terminal 57 is a conductor 59 which is connected to the binding post 39, the latter being in contact with the terminal 38 of the solenoid. A conductor 60 is secured to one end of the pin 53 and is connected at its other end to the battery 61, which is grounded at 62. The conductor 43 is connected to the conductor 60 at a point 64, and is also connected at its other end to the contractor 42.

The operation of the device is as follows:—When the arm 56 of the ignition switch is being turned from "off" to "on" position, it wipes the terminal 57 and thereby establishes a temporary circuit which includes the grounded battery 61, the conductor 60, the arm 56, of the switch, the terminal 57, the conductor 59, the solenoid 25 and the grounded conductor 41. The core 24 is magnetized by this temporary circuit. Magnetization of the core is effected to raise the pivot ring 45 so that the projection 46 of the ring presses the contactor 42 upwardly until it touches the contactor 40. The contactors 40 and 42 touching each other through the momentary energizing of the solenoid 25, establish a closed circuit comprising the grounded battery 61, part of the conductor 60, the conductor 43, the contactors 42 and 40, the solenoid 25 and the grounded conductor 41. It will therefore be seen that the temporary circuit remains closed long enough to close the closed circuit, the latter remaining closed while the first mentioned circuit is broken upon the further turning of the switch arm 56 to contact 55. This circuit remains closed until the core 24 is moved upwardly to such an extent that the member 35 comes into contact with the contactor 40 and presses it upwardly until it is separated from the contactor 42. When the contactors 40 and 42 are separated from each other the electrical circuit is broken and the core, together with its attached plunger, falls.

It will be readily appreciated, however, that the rise of the core is effective to raise the plunger so that the latter exerts a pressure on the lubricant, whereupon the valve 12 is raised from its seat and the lubricant passes into the tubes 8. It will also be readily appreciated that when turning off the ignition switch the same action takes place as in turning it on.

While I have described one embodiment of my invention, modifications thereof may be readily devised without departing from the spirit of my invention, and it is to be understood that such modifications come within the scope of the appended claims.

I claim:—

1. In a lubricating system, a plunger, a solenoid core adapted to actuate said plunger, a solenoid, a terminal contactor on said solenoid, a second contactor normally separated from said first contactor, an ignition switch of an internal combustion engine, electrical power means connected to said switch, means actuatable by the magnetized core for bringing said contactors together, a first electrical circuit including said power means, said switch and said solenoid being adapted to be electrically energized when said ignition switch is being moved from "off" to "on" position whereby said means actuatable by the magnetized core is effective to bring together said contactors, a second electrical circuit including said power means, said contactors and said solenoid adapted to be energized by said power means and means adapted to separate said contactors, the last mentioned means being actuated by said core.

2. The combination described in claim 1 in which said switch comprises a movable member and a contactor adapted to contact with said movable member for a comparatively short period of time as said movable member moves from "off" to "on" position.

3. The combination described in claim 1 in which said switch comprises a movable member and a contactor adapted to contact with said movable member for a comparatively short period of time as said movable member moves from "off" to "on" position or vice versa.

4. In a lubricating system, a plunger, a solenoid core adapted to actuate said plunger, a solenoid, a terminal contactor on said solenoid, a second contactor normally separated from said first contactor, an ignition switch of an internal combustion engine, electrical power means connected to said switch, means actuatable by the magnetized core for bringing said contactors together, a first electrical circuit including said power means, said switch and said solenoid being adapted to be electrically energized when said ignition switch is being moved from "off" to "on" or "on" to "off" position whereby said means actuatable by the magnetized core is effective to bring together said contactors, a second electrical circuit including said power means, said contactors and said solenoid adapted to be energized by said power means and means adapted to separate said contactors, the last mentioned means being actuated by said core.

5. In a lubricating system, a solenoid, a core therefor, a plunger for moving a lubricant, said core and plunger being operatively connected together, a manually-controlled switch for closing a circuit through said solenoid, a magnetically-controlled switch actuated when the solenoid is energized for keeping the circuit through the solenoid closed, and means actuated by said solenoid for opening the magnetic switch after said core and plunger have moved a predetermined distance, whereby an operation of said manually-operated switch results in the plunger applying a pressure on the lubricant.

6. In a controlling means for a lubricating system, a solenoid, a core, a pump operatively connected to said core for forcing a lubricant to the parts to be lubricated, a switch for closing a circuit to said solenoid for actuating said core, a second switch actuated when said solenoid is energized for keeping the circuit closed to said solenoid, and means operatively connected to said core for opening said second-named switch after said core has moved a predetermined distance.

7. In a lubricating system, a casing for holding a lubricant, a valve mounted in said casing, a solenoid having a plunger for forcing the lubricant past said valve, a switch for closing a circuit to said solenoid, a second switch actuated when said solenoid is energized for keeping the circuit closed to said solenoid, and means for opening said second named switch after said plunger has moved a predetermined distance.

COY C. GOODRICH.